(12) United States Patent
Rode et al.

(10) Patent No.: US 9,855,899 B2
(45) Date of Patent: Jan. 2, 2018

(54) APPARATUS FOR MOUNTING A DISPLAY ELEMENT IN A MOTOR VEHICLE

(71) Applicant: Visteon Global Technologies, Inc., Van Buren Township, MI (US)

(72) Inventors: Andreas Rode, Kerpen (DE); Dirk Nolten, Kreuzau (DE); Andres Gottschalk, Eschweiler (DE); Michael Grebenstein, Kerpen (DE); Teodoro Deus, Moita (PT)

(73) Assignee: Visteon Global Technologies, Inc., Van Buren Township, MI (US)

( * ) Notice: Subject to any disclaimer, the term of this patent is extended or adjusted under 35 U.S.C. 154(b) by 85 days.

(21) Appl. No.: 14/826,309

(22) Filed: Aug. 14, 2015

(65) Prior Publication Data

US 2016/0046243 A1    Feb. 18, 2016

(30) Foreign Application Priority Data

Aug. 15, 2014  (DE) .......................... 10 2014 111 676

(51) Int. Cl.
*B60R 11/02*    (2006.01)
*B60R 11/00*    (2006.01)

(52) U.S. Cl.
CPC ...... *B60R 11/0229* (2013.01); *B60R 11/0235* (2013.01); *B60R 2011/0085* (2013.01)

(58) Field of Classification Search
CPC ........... Y10T 403/11; Y10T 403/32557; Y10T 403/32591; Y10T 16/54; E01F 9/635; B60R 11/025; B60R 2011/0085
See application file for complete search history.

(56) References Cited

U.S. PATENT DOCUMENTS

| | | | |
|---|---|---|---|
| 2,309,238 A * | 1/1943 | Corey | E03B 9/02 285/119 |
| 4,236,843 A * | 12/1980 | Chisholm | E04H 12/22 285/4 |
| 7,363,148 B1 | 4/2008 | Laverick et al. | |
| 7,579,939 B2 * | 8/2009 | Schofield | B60C 23/00 340/425.5 |
| 2002/0005917 A1 | 1/2002 | Rosen | |
| 2008/0168622 A1 * | 7/2008 | Hsu | F16M 11/10 16/319 |

FOREIGN PATENT DOCUMENTS

DE    10 2009 033 877 B3    10/2010

* cited by examiner

*Primary Examiner* — Adam Waggenspack
(74) *Attorney, Agent, or Firm* — Dickinson Wright PLLC

(57) ABSTRACT

An apparatus for mounting a free-standing display element is disclosed herein. The apparatus is u-shaped, and provides a joint that allows movement in a rotational manner to and from the viewer of the display. The mounting may occur in a motor vehicle. In response to force being applied to the display, the apparatus is configured to either maintain (or lock into a position), or allow movement along the rotational axis.

8 Claims, 1 Drawing Sheet

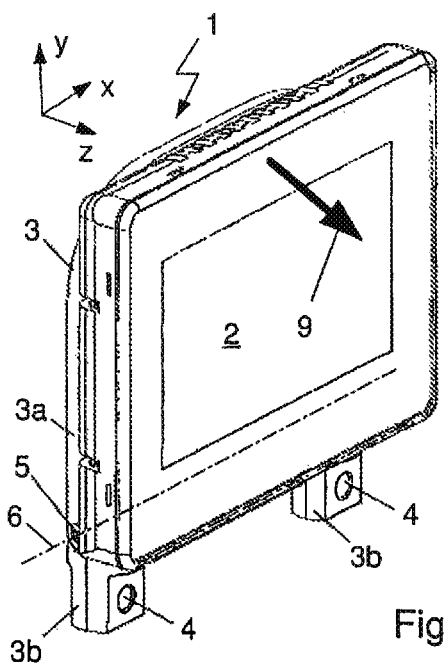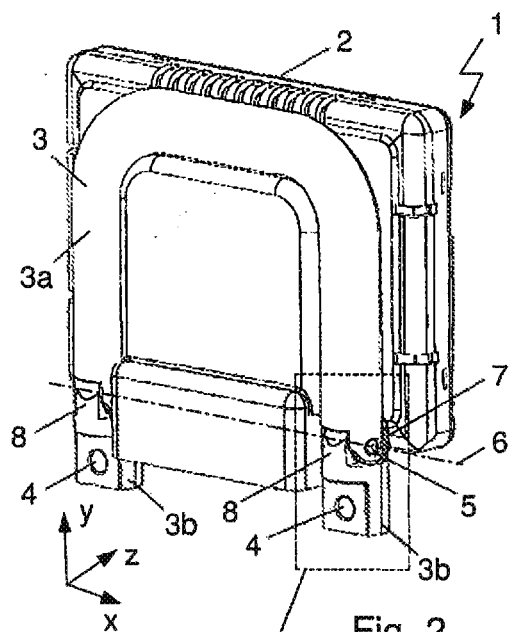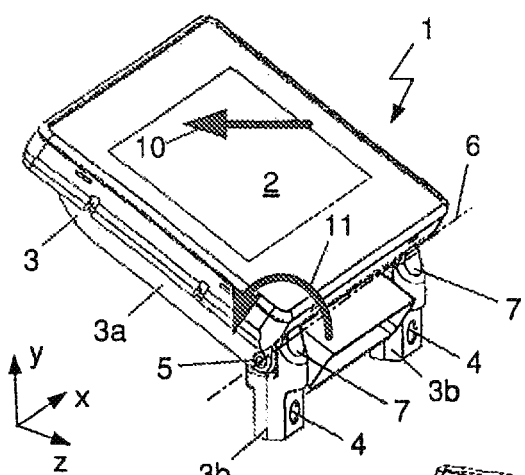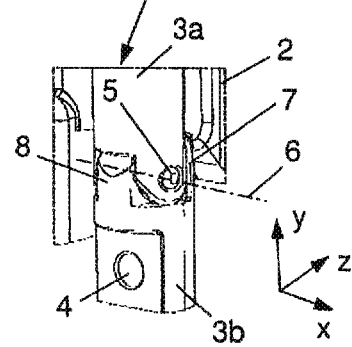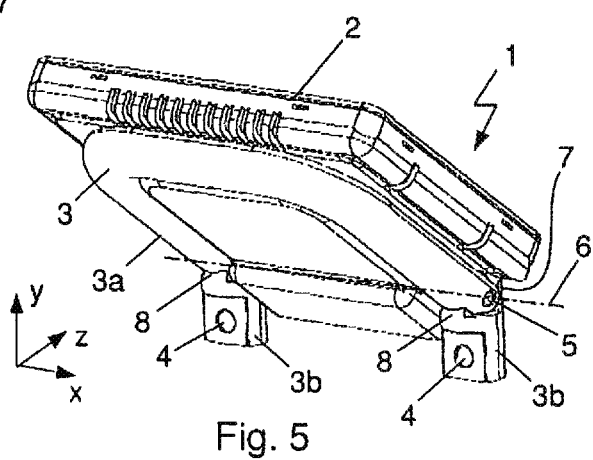

APPARATUS FOR MOUNTING A DISPLAY ELEMENT IN A MOTOR VEHICLE

CROSS-REFERENCE TO RELATED APPLICATIONS

This application claims priority to German Patent Application No. 10 2014 111 676.3, filed Aug. 15, 2014 entitled "APPARATUS FOR MOUNTING A DISPLAY ELEMENT IN A MOTOR VEHICLE," which is herein incorporated by reference.

BACKGROUND

The operation of motor vehicles may be facilitated by user interfaces, such as knobs or other mechanical switches. In recent times, these controls have transitioned to a digital display, provided with a touch screen capability. Thus, these displays may be situated in an area of a vehicle observable by a driver or passenger.

These displays are aided by implementations that withstand strong tensile forces and compressive forces. The strong tensile and compressive forces can also be caused, for example, by improper use, or by other external events, such as a vehicle crash or the like. Fixed mounted display elements arranged as standalones can be exposed to strong tensile forces in different directions in the range from 200 Newtons (N) to 1000 N.

In certain situations, the displays may be implemented as standalone device. In these scenarios, the displays may have to fulfill certain safety requirements, such as a head impact test. The head impact test is a test in which a strong compressive force acts on the display element for a short time. In order to pass this test, the display is required to give way to the compressive force. For example, if the display stays still (i.e. relatively rigid), the display may cause injury to either the driver or passenger.

Firmly and inflexibly mounted display elements arranged as standalones are known that withstand strong tensile forces. However, these displays do not offer sufficient safety for the absorption of the energies occurring during a head impact. Display elements of this kind in the conventional embodiments consequently do not fulfill the safety requirements of the head impact test. The known, fixed mounted arrangements of the display elements are suitable merely for lower impacting forces.

Movable, and in particular pivotable or foldable display arrangements are known for motor vehicles. However, the display elements are pivoted without consideration for compressive forces, as they occur, for example, during a head impact.

For example, in one conventional implementation, an entertainment system for vehicles is arranged overhead and with a hinge assembly group for pivoting and holding a video monitor between a stowing position and a swung-out position.

The hinge assembly group therein includes a housing and a monitor cover for holding the video monitor. The cover is set to be pivotable about a swivel or rotation axis on the housing. Furthermore, a friction element is arranged either on the housing or on the cover, and it is positioned in a sliding contact that is positioned on a contact surface arranged either on the cover or on the housing. The friction element is offset radially from the rotation axis. Due to the rotation of the cover about the rotation axis, the friction element slides along the contact surface.

Furthermore, also disclosed are various display elements and housings with an electrical motor. The electrical motor brings the display element into a stop position in the dashboard or the center console in response to a predefined tensile or compressive force exerted on the apparatus. In case of excessive stress, for example, through improper use or an accident, the display element is moved into a protective position by the electrical motor.

In another conventional implementation, a display unit for the passenger compartment of a motor vehicle includes a housing for accommodating a display element and the display element. The display element, which is arranged at the roof and thereby overhead, is mounted pivotable about a rotation axis, in between a use position and a stowing position. In the stowing position, the display element is arranged at least in part within the housing, while it protrudes from the housing in the use position in such a way that a display surface becomes visible to the viewer. The display unit is furthermore provided with a clamping mechanism to lock the display element in the housing in the stowed condition.

The display unit is further provided with a safety feature in order to be pivoted in the driving direction of the vehicle towards the roof if needed, for example, during an accident and exposure to sufficiently strong compressive force, whereby it is prevented from becoming an object a passenger can collide with.

In another example, a display unit with the capacity to fold away upon exposure to a sufficiently strong compressive force has a characteristic aiming at the safety of the passengers is also provided. However, the display unit is not laid out for the purpose of simultaneously ensuring sufficient resistance against tensile forces, as it is to be brought either into the stowing position or into the use position through exertion of a tensile force.

The display systems discussed above are provided for one application or another. However, none of these display systems absorb strong tensile forces while pivoting or allowing movement if the display system realizes a force in a specific direction with a predefined tensile force.

SUMMARY

The problem to be solved by the invention is the provision of an apparatus for mounting a freely or firmly set up display element in a passenger compartment of a motor vehicle, which can absorb strong tensile forces in the driving direction of the vehicle and simultaneously move out of this direction when a predefined compressive force is exceeded and without representing a collision object.

The apparatus is to have a minimum of complexity and its implementation and production is to be simple. Thereby, the apparatus is to cause only minimal manufacturing and maintenance costs and is to be usable cost-efficiently.

The problem is solved by the object with the characteristics of the independent patent claim. Further developments are specified in the dependent patent claims.

The problem is solved by an apparatus according to the invention for the mounting of a display element in a passenger compartment of a motor vehicle. The display element is arranged freely and firmly in the passenger compartment. The apparatus is provided with a retaining element, which is comprised of a first component and at least a second component. The second or further components of the retaining element are arranged mounted in the passenger compartment.

According to the conception of the invention, the first component and the second or further components are connected with each other by a joint so that they are pivotable about a rotation axis. In the area of the joint, a triggering element is arranged and designed in such a way that the joint is locked upon action of force below a predefined limit value and upon action of force of at least the predefined limit value, and permits a rotational movement of the joint. Locking of the joint is understood to mean that the joint is rigid and that no rotational movement is possible between the areas of the retaining element that are linked by the joint.

In a preferred embodiment of the invention, the triggering element is arranged in such a way that it facilitates that the joint is locked in the driving direction of the motor vehicle, that it is triggered when the limit value of the action of force is reached, and that the joint makes a rotational movement in driving direction of the motor vehicle. A force essentially acting in the driving direction is understood to mean compressive force in the following.

According to a further development of the invention, the triggering element is arranged behind the joint in the driving direction of the motor vehicle and thus in a horizontal direction.

The triggering element is herein preferably connected rigidly with the second component of the retaining element, so that the second component of the retaining element and the triggering element are designed as one piece.

A further beneficial embodiment of the invention is comprised in that the triggering element is laid out as a predetermined breaking point.

A predetermined breaking point in this regard means a structural element determined by the type of construction in conjunction with mechanical or physical properties of the material. In the case of damage or overload, for example, through action of forces above a limit value, the structural element will fail specifically and predictably in order to thereby avoid or minimize potential damage or to fulfill a special function.

The display element is preferably arranged on the first component of the retaining element. The first component of the retaining element and the display element are connected firmly with each other. The firm connection is ensured, for example, by clip-in or click-in or screw connection.

The rotation axis of the rotational movement of the first component relative to the second or further components of the retaining element and respectively the joint is preferably aligned in a horizontal direction. Preferably, the horizontal direction therein runs vertically to the likewise horizontal driving direction of the motor vehicle.

According to a preferred embodiment of the invention, the first component of the retaining element is designed in a U-shape consisting of two legs aligned parallel to each other and one cross link arranged on the first ends of the legs. At the same time, the free ends of the legs are respectively connected with a second component by a joint.

The display element is preferably arranged between the legs and the cross link of the legs. The joints preferably have a common rotation axis.

According to a further development of the invention, a limit stop is arranged in the area of the joint and designed in such a way that the joint is locked in the opposite direction of the driving direction of the motor vehicle upon action of force below a predefined limit value and permits a rotational movement of the joint opposite the driving direction of the motor vehicle on action of force of at least the predefined limit value. A force exerting effects essentially in the opposite direction of the driving direction of the motor vehicle is understood to mean a tensile force in the following.

According to a further embodiment of the invention, the limit stop is arranged in the driving direction of the motor vehicle and thus, in a horizontal direction in front of the joint.

At the same time, the limit stop is preferably connected rigidly with the second component of the retaining element, so that the second component of the retaining element and the limit stop are designed as one piece.

The foldable or pivotable apparatus for mounting a display element according to the invention, in particular for mounting a standalone display element, is designed for the prevention of damages through excessive forces and for protection from excessive stress. The apparatus is at the same time capable of withstanding a defined force, in particular a defined compressive force, yet also a defined tensile force acting in the opposite direction. The apparatus, however, is also designed in such a way that a rotational movement is carried out by means of a joint as soon as the forces exceed certain limit values.

The physical properties such as the elastic limit of the raw materials or materials used, in combination with the cross section of the limit stop, permit a definition of the maximum tensile force to which the apparatus is resistant. The maximum possible compressive force for triggering the rotational movement is furthermore defined through a suitable structural design of the triggering element as a predefined breaking point, in combination with the physical properties of the material.

In summary, the apparatus according to the invention for mounting the display element is characterized by the following further benefits:
the simple physical concept enables a minimal complexity of the structure and the elements used, and
simple and cost-efficient manufacturing and maintenance.

BRIEF DESCRIPTION OF DRAWINGS

Further details, characteristics and advantages of embodiments of the invention are explained in the following description of the design example with reference to the related drawings. The figures show the apparatus with a display element.

FIG. 1 illustrates a lateral front view of the display element, in the position of use, FIG. 2 illustrates a lateral rear view of the display element, with a retaining element, in the position of use, FIG. 3 illustrates an enlargement of an area of the retaining element with a limit stop and a triggering element, in the position of use, FIG. 4 illustrates a lateral front view of the retaining element with the limit stop and a triggering element, in the position after triggering of the triggering element, and FIG. 5 illustrates a lateral rear view of an area of the retaining element with a limit stop and a triggering element, in the position after triggering of the triggering element.

DETAILED DESCRIPTION

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Aspects disclosed herein relate to mounting a display element. The display element may be situated in a passenger compartment of a motor vehicle. The display element may include a retaining element, which is embodied as a first component and at least a second component. The second or further components are arranged fixed in the passenger compartment.

FIG. 1 and FIG. 2 show the apparatus 1 in a lateral front view of the display element 2 with the retaining element 3 in a lateral rear view of the display element 2, respectively. The apparatus 1 with display element 2 is arranged in an upper area of a dashboard or the center console of the motor vehicle.

The display element 2, which extends in the directions x, y and possesses a depth in direction z, is provided with a display area on the front side. The display area may be employed to display information to the passengers and is firmly connected with retaining element 3 on the back side. The display element 2 and the retaining element 3 form a connected, single-piece unit.

The retaining element 3 designed in U-shape, preferably made of a metal, is mounted by a retaining element 4 on the dashboard or the center console in the passenger compartment of the motor vehicle. Besides metal, the material of the retaining element 3 may also be plastic and/or carbon such as diamond or coal.

The retaining elements 4 are provided in U-shape configuration (as shown) with openings on the open end for inserting screws or bolts. The display element 2 is arranged within the area of the retaining element 3 that is enclosed by the legs and the connection of the legs. The legs are therein aligned in the vertical direction y, while the connection of the legs are aligned in the horizontal direction x, and the legs are linked with each other on the upper ends.

The retaining element 3 may have two components, 3a and 3b. The first component 3a is connected with the second component 3b respectively by a joint 5. The second component 3b is arranged at the lower ends of the legs of the U-shaped area 3a. The joints 5, as the connecting elements of components 3a, 3b of the retaining element 3, have a common rotation axis 6. The rotation axis 6 is aligned in the horizontal direction x.

The first component 3a is connected to be pivot-able about the rotation axis 6 in contrast to the second components 3b, which is connected rigidly with the dashboard or center console.

The second components 3b each have a limit stop 7 on the ends that are aligned with the first component 3a as well as a triggering element 8. The limit stops 7 are arranged in the front area of the joints 5, while the triggering elements 8 are arranged in the back area of the joints 5. The references here to front and back area respectively refer to the pane spanned in the vertical direction z and through rotation axis 6 of the joints 5 and consequently in the direction x or the driving direction of the motor vehicle. The front area of the retaining element 3 is aligned in the direction of the display element 2 and towards the passenger. The rear area of the retaining element 3 is aligned away from the display element 2 and away from the passenger.

The limit stops 7 and the triggering elements 8 limit the joints 5 in the horizontal direction z, which is aligned vertically to rotation axis 6, which is also shown in FIG. 3. FIG. 3 shows the enlargement of an area of the joints 5 and the retaining element 3 with a limit stop 7 and a triggering element 8 in the use position of the apparatus 1. A use position indicates a position in which the display element 2 is upright (or significantly upright and within the rotation limited by the limit stops 7).

Each joint 5 is arranged in horizontal direction z between a limit stop 7 and a triggering element 8. As the limit stops 7 and the triggering elements 8 are sections of the second component 3b, and are firmly connected with the second component 3b. The limit stops 7 and triggering elements 8 are shaped to fit respectively on the first component 3a in the area of the joints 5. The limit stops 7 and the triggering elements 8 prevent a rotational movement of the first component 3a relative to the second components 3b, and thus prevent a rotational movement of the display element 2 about the rotation axis 6. Joints 5 are rigid and not pivoting with the arrangement of the limit stops 7 and the triggering elements 8 according to FIG. 1 to FIG. 3. Thus, Joints 5 are fixed.

The limit stops 7 are designed in rod-shapes or strip-shapes, and the triggering elements 8 protrude from the second components 3b and the retaining element 3 in vertical direction y and have a contact surface in direction z of joints 5 and the first component 3a of the retaining element 3. The contact surfaces are arranged on a pane spanning from directions x, y and are respectively closed off by a straight edge aligned in horizontal direction x, on the end facing away from the second component 3b of the retaining element 3.

The first component 3a is provided with moldings in the area of the joints 5, which on the one hand respectively correspond with the straight edge aligned in horizontal direction x and on the other hand with the contact surface of the limit stops 7 and the triggering elements 8. The ends of the first component 3a of the retaining element 3 thereby likewise having contact surfaces in the area of the joints 5, are fitted on the contact surfaces of the limit stops 7 and the triggering elements 8. The limit stops 7 and the triggering elements 8 of the second component 3b, and the first component 3a are consequently fitted onto each other on adjacent surfaces. The edges of the first component 3a in horizontal direction x, which are provided with molds, are simultaneously fitted on the edges of the limit stops 7, which are likewise arranged in horizontal direction x and on the triggering elements 8. Through the fitting of the horizontal edges and the vertically aligned contact surfaces, the joints 5 are stabilized and held in a rigid state during the use of the apparatus.

The molds of the first component 3a are furthermore provided with a surface extending in an elbow in the area of the joints 5, which is formed between the contact surface facing the triggering element 8 and the vertical end facing the second component 3b. The elbow surface therein has a radius of rotation axis 6 of the joints 5. When force is applied to the triggering elements (i.e. from the rotational movement of the first component 3a as applying force to the second component 3b), a triggering event may be caused (i.e. the applied force being above a predetermined threshold). The elbow surface passes over the vertical end the second component 3b facing the first component 3a, without presenting an additional obstacle to the rotational movement. The compressive force required for the triggering is consequently exclusively defined by the specific layout and arrangement of the triggering elements 8. The triggering event may be accomplished by the triggering elements 8 being a "break-away-tab". I.e., the triggering elements 8 may be configured to collapse or no long maintain a fixed orientation. Thereby moving the limit stops 7 from their current location.

The limit stops 7 are arranged in the front area of retaining element 3, and are aligned in the direction 9 of tensile forces acting on the apparatus 1. The limit stops 7, in one example may be capable of withstanding tensile forces in the range from 200 N to 1000 N acting in the direction 9. As long as these tensile force values are not exceeded, the limit stops 7 may maintain structural integrity. Thus, the rotational movement about the rotation axis 6 being effected by the tensile force in the direction 9 is possible. The tensile forces act in this process primarily in horizontal direction z. Direction 9 represents the direction of the main component of the tensile force.

Apparatus 1 permits resistance to a predefined maximum tensile force without realizing any breakdown or damage.

FIG. 4 and FIG. 5 show the apparatus 1 with a lateral front view of the display element 2 with the retaining element 3 and additionally, with retaining element 3 in lateral rear view of the display element 2, respectively, in response to the triggering of the triggering elements 8. The triggering elements 8 release the rotational movement 1 of the joints 5 about the rotation axis 6 when a limit value for the compressive force acting in a direction 10 is exceeded. The compressive forces in this process act primarily in horizontal direction z, counter to the tensile forces. Direction 10 represents the direction of the main component of the compressive force.

The triggering elements 8 arranged in the rear area of retaining element 3 are arranged in direction 10 aligned to a compressive force acting on apparatus 1 and laid out for certain values of compressive forces acting in direction 10. Only when predefined compressive force values are exceeded, the triggering elements 8 might not resist the compressive force and burst, so that the rotational movement 11 about the rotation axis 6 can be effected by the compressive force in direction 10.

The resistance against the predefined maximum compressive forces under which the triggering elements 8 burst is defined by the type of construction, for example, by the design of the cross section of triggering elements 8 and the physical properties of the materials used. The triggering elements are designed as a predefined breaking point on the retaining element 3. The material of triggering elements 8 as predefined breaking points can comprise metal, plastic and/or carbon.

Both the bursting of the limit stops 7 due to transgression of a limit value for the tensile force in direction 9 as well as the bursting of the triggering elements 8 due to transgression of a limit value of the compressive force in direction 10 and thereby, the defined triggering of the rotational movement of joints 5 about the rotation axis 6 is defined by the cross section of limit stops 7 and respectively the triggering elements 8, in combination with the elastic limit of the material used. Through the cross sections of limit stops 7 and respectively the triggering elements 8, in combination with the elastic limit of the respective materials used, the maximum possible tensile force as well as the maximum possible compressive force or impact force is thus defined, under which a latching operation of apparatus 1 is triggered.

Through the arrangement of joints 5 with the common rotation axis 6, a rotation axis is furthermore defined, about which apparatus 1 and in particular the display element 2 is rotated if needed.

When a compressive force in excess of the limit value is exerted, the apparatus 1 can be folded backwards, i.e. in the opposite direction of direction z and in the driving direction of the motor vehicle, so that in the instance of a collision, for example, a passenger or the head of the passengers contact with said apparatus 1 is mitigated.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An electronic display with a display element and a mounting apparatus, comprising:
   a retaining element with a first component and a second component, the first component and the second component are connected by a joint, the joint allowing for a pivot about a rotation axis, the first component being integrally formed with the display element;
   a triggering element integrally formed on the second component, extending vertical in a direction parallel to a viewable screen of the display element;
   a limit stop integrally formed on the second component, extending vertical in the direction parallel to a viewable screen of the display element,
   the limit stop and the triggering element defining an opening in between, the joint being disposed with in the opening;
   the triggering element being configured to break-away in response to at least 200 or more Newtons of force being applied in a first rotation direction of the rotation axis, and
   the limit stop being configured to break-away in response to at least 200 or more Newtons of force being applied in a second rotation direction of the rotation axis, the second rotation direction being opposite to the first rotation direction,
   the triggering element and the limit stop being non-movable prior to at least 200 or more Newtons of force being applied in either the first rotation direction or the second rotation direction.

2. The apparatus according to claim 1, wherein the joint is situated on a non-viewing side of the display element.

3. The apparatus according to claim 1, wherein the triggering element is behind the joint.

4. The apparatus according to claim 2, wherein the triggering element is behind the joint.

5. The apparatus according to claim 2, wherein the display element is attached to the first component.

6. The apparatus according to one of the claim 1, wherein the rotation axis is aligned in a horizontal direction of the display element.

7. The apparatus according claim 1, wherein the first component comprises a U-shaped element, with two legs aligned parallel to each other, and a cross link being arranged on a first end of each of the legs, wherein a free end of each of the legs are connected to the second component.

8. The apparatus according to claim 7, wherein the second component has a first part and a second part, the first part being connected to a first free end and the second part being connected to a second free end.

* * * * *